Sept. 29, 1936.  K. J. TOBIN  2,055,829
HOLD-DOWN DEVICE FOR AUTOMOBILES
Filed March 24, 1932
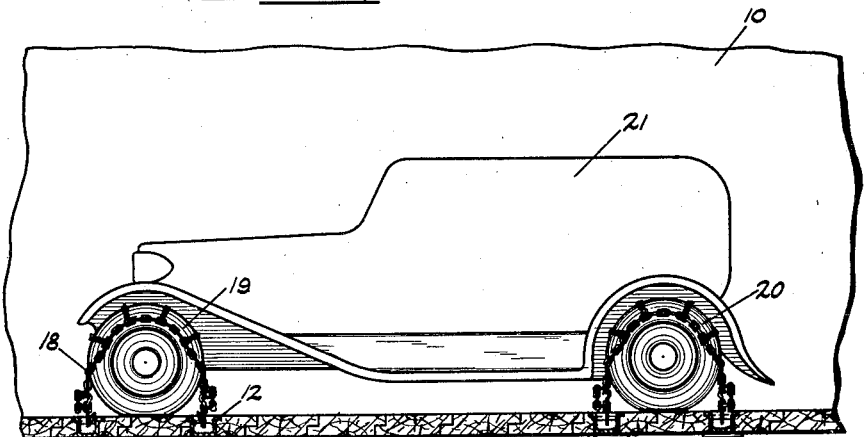
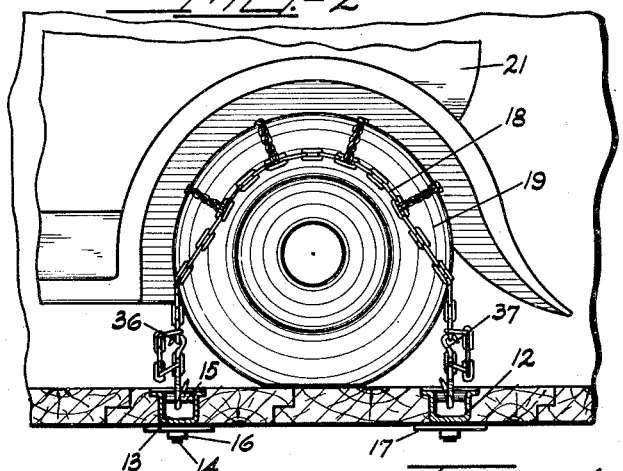
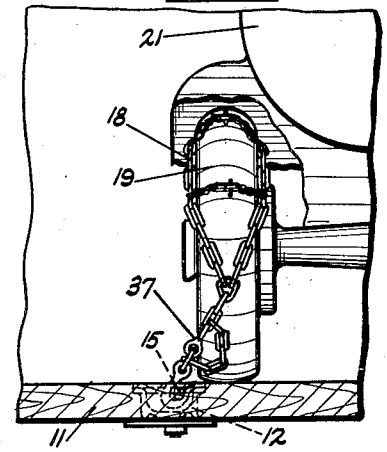
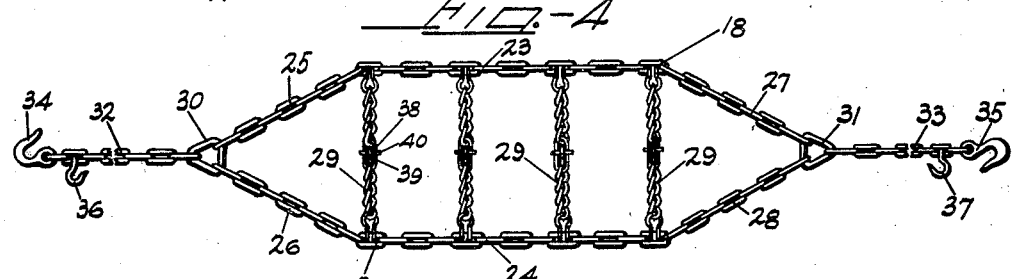
-INVENTOR-
KENNETH J. TOBIN
By- Samuel Reese
ATTY.

Patented Sept. 29, 1936

2,055,829

UNITED STATES PATENT OFFICE 2,055,829

HOLD-DOWN DEVICE FOR AUTOMOBILES

Kenneth J. Tobin, Chicago, Ill., assignor, by mesne assignments, to Evans Products Company, Detroit, Mich., a corporation of Delaware Application March 24, 1932, Serial No. 600,861

2 Claims. (Cl. 248—119)

This invention relates to hold-down devices for automobiles and concerns itself primarily with such devices adapted to be secured to the floor of a transportation vehicle and to retain automobiles against movement therein through engagement with the wheels of said automobiles.

It is an object of this invention to provide hold-down devices engageable with the wheels of automobiles to retain said automobiles against movement in transportation vehicles, the devices being flexible to permit their arrangement when not in use in small compass.

A further object is to provide hold-down devices for automobiles composed of chains.

A further object is to provide metallic hold-down devices which are strong, extremely flexible and capable of application to automobile wheels of varying sizes.

A further object is to provide hold-down devices for automobiles having ends engageable with anchoring devices secured to the floors of transportation vehicles to retain said hold-down devices in firm engagement with the wheels of said automobiles to which they are applied.

Other objects of the invention will become apparent as the description thereof proceeds:

In the drawing

Figure 1 is a partial section of a transportation vehicle showing an automobile fastened to the floor thereof against movement by the hold-down devices of the invention.

Figure 2 is an enlarged fragmentary view of an automobile within a transportation vehicle, showing the relationship between a hold-down device and automobile wheel and the floor of the transportation vehicle.

Figure 3 is an end view looking toward the left as viewed in Figure 2.

Figure 4 is a detail of the hold-down device embodying this invention.

Figure 5 is a detail of an adjusting means.

Referring to the drawing, which illustrates a preferred embodiment of the invention, the numeral 10 designates a fragmentary portion of a transportation vehicle, such as a railway freight car, provided with the customary wooden floor 11. The floor 11 is provided with a plurality of anchoring devices 12 received within openings provided in the floor. The anchoring devices are identical in structure and each comprises a substantially channel shaped body portion 13 from which a threaded shank 14 depends. The upper margins of the spaced walls of the anchoring devices are connected by means of a cross member 15. The anchoring devices are secured in position in the floor by means of the nuts 16 threaded on the shank portions 14 into engagement with a plate member 17 provided with openings through which a plurality of the shanks of the anchoring devices extend. These anchoring devices provide means for engagement of the ends of the hold-down devices 18 of the instant invention.

The hold-down devices are shown in their operative relationship with the wheels 19 and 20 of the automobile 21 supported upon the floor of the transportation vehicle. As best illustrated in Figure 4 of the drawing, the hold-down device 18, one of which is preferably applied to each of the wheels of the automobile, comprises an intermediate wheel engaging portion 22 which preferably takes the form of a geometrical figure. In the embodiment illustrated the wheel engaging portion embodies the spaced parallel sides 23 and 24 from the ends of which the sides 25—26 and 27—28 extend in converging relationship so as to provide a substantially hexagonal design. Extending between and connecting the sides 23 and 24 of the wheel engaging portion is a plurality of spaced connecting members 29. The converging sides 25—26 and 27—28 are connected to the respective links 30 and 31. From these links the end or fastening portions 32 and 33 of the hold-down device extend. These fastening portions each includes a plurality of hooks 34—35 and 36—37. The hooks 34—35 are the anchoring hooks whereas the hooks 36—37 are adapted for selective engagement with the end fastening portions in order to vary the effective length of the hold-down device.

The connecting members 29 are capable of adjustment. One form of adjusting means is illustrated in Figure 5 of the drawing and embodies a link 38 having a hook 39 pivotally connected to one end thereof. A retaining link 40, the ends of which are spaced and lie under said link 38, embraces the latter and extends transversely thereof to effect interlocking engagement with the hook 39 to retain said hook in fixed relationship with the link 38. The hook 39 may extend through any of the cross links in the member 29 to vary the distance between the sides 23 and 24 of the intermediate wheel portion 22 depending upon the diameter of the tire of the wheel. The adjusting means described above forms no particular part of this invention, it being understood that adjustment of the cross-members 29 may be had by any desired form of adjusting means other than the one illustrated.

In its structure the hold-down device is preferably formed of chain. The substantially hexagonal part of the intermediate wheel engaging portion is formed preferably of passing links which are utilized in the formation of the end fastening portions as well. The transverse connecting chains 29 are preferably formed of cross links. By the use of chain in the construction of the hold-down device it is apparent that a great degree of flexibility of the hold-down device is obtained, which makes for ready application of a hold-down device to a wheel of an automobile and which permits the hold-down device to be stored in a relatively small space. In addition, the use of chain presents a very sturdy construction.

In its application to a wheel the intermediate wheel engaging portion of the hold-down device is placed upon the wheel so that the sides 23 and 24 thereof lie upon opposite sides of said wheel. The cross chains 29 extend across the periphery of the wheel. The end fastening portions of the hold-down device are then secured to the floor of the car by engaging the hooks 34—35 of said hold-down devices with the cross members 15 of the anchoring devices. As clearly illustrated in Figure 2 of the drawing the effective length of the hold-down device has been decreased by the engagement between the hooks 36—37 and an intermediate link in each of the end fastening portions. In the preferred use of the hold-down device it is applied to a wheel subsequent to the deflation of said wheel. After the hold-down device has been properly arranged in its operative position the wheel is inflated, whereupon the hold-down device is properly tensioned and effective to maintain the wheel in position upon its support against movement thereon. While this method of arrangement of a hold-down device upon a wheel is desirable because of its extreme simplicity it is to be understood that the application of a hold-down device for its intended purpose is not limited thereto. It will be apparent that other means for tensioning the hold-down device may be utilized—for example, a turnbuckle may be inserted between links of the hold-down device whereby tension may be applied thereto.

The term "wheel" used throughout the specification and claims is intended to include the tires normally employed upon the wheels of automobiles.

Numerous changes and modifications in the details of the invention will occur to those skilled in the art. It is intended, therefore, that all such changes and modifications are to be included within the invention, which is to be limited only by the scope of the claims appended hereto.

I claim:

1. A hold-down device adapted to engage the tire of an automobile wheel to hold an automobile against movement on a supporting floor, said hold-down device comprising an intermediate portion of a length less than the circumference of the tire and adapted to engage the tread of only a limited portion of the tire adjacent the top of the wheel, said intermediate portion including flexible side members adapted to engage opposite sides of the tire and spaced cross chains adapted to extend across the periphery of the tire and connected to said side members, flexible end fastening portions projecting in opposite directions from said intermediate portion, means on said end portions for connecting them to the floor, and take-up means in said end portions for varying the effective length thereof whereby said device can be adapted, without change in the parts thereof, to tires of varying outside diameters and varying transverse thickness.

2. A hold-down device adapted to engage the tire of an automobile wheel to hold an automobile against movement on a supporting floor, said hold-down device comprising an intermediate portion of a length less than the circumference of the tire and adapted to engage the tread of only a limited portion of the tire adjacent the top of the wheel, said intermediate portion including flexible side members adapted to engage opposite sides of the tire, spaced cross chains adapted to extend across the periphery of the tire and connected to said side members, and converging chains extending from adjacent ends of said side members and connected to flexible end fastening portions projecting in opposite directions from said intermediate portion, means on said end portions for connecting them to the floor, and take-up means in said end portions for varying the effective length thereof whereby said device can be adapted, without change in the parts thereof, to tires of varying outside diameters and varying transverse thickness.

KENNETH J. TOBIN.